Jan. 4, 1955

J. HAUK

2,698,644

AUTOMATIC SPACER GLUING MACHINE FOR
PRESSBOARD INSULATING WASHERS

Filed Sept. 29, 1952

J. HAUK

2,698,644

AUTOMATIC SPACER GLUING MACHINE FOR
PRESSBOARD INSULATING WASHERS

Filed Sept. 29, 1952

Inventor
Joseph Hauk
by Joseph E. Kerwin
Attorney

J. HAUK 2,698,644

AUTOMATIC SPACER GLUING MACHINE FOR
PRESSBOARD INSULATING WASHERS

Filed Sept. 29, 1952

Inventor
Joseph Hauk
by Joseph E. Kerwin
Attorney

Fig. 25

United States Patent Office 2,698,644
Patented Jan. 4, 1955

2,698,644

AUTOMATIC SPACER GLUING MACHINE FOR PRESSBOARD INSULATING WASHERS

Joseph Hauk, Waukesha, Wis., assignor to Allis-Chalmers Manufacturing Company, Milwaukee, Wis.

Application September 29, 1952, Serial No. 312,149

15 Claims. (Cl. 154—1.6)

This invention relates generally to machines having an article storage hopper and including apparatus for successively and individually feeding articles from the hopper to automatic machine parts by which those articles are individually, preferably glued, to another object. More particularly, this invention relates to an automatic machine for successively gluing spacer blocks to a disk or washer of pressboard insulation by which machine the spacer blocks are automatically and uniformly spaced on the disk or washer.

The product made by this machine is primarily intended for embodiment in a winding stack of electrical induction apparatus such as a transformer. This product is a relatively large pressboard washer disposed in the winding stack of the electrical coils. Preformed disk coils are disposed on either side of the washer. And the spacer blocks are uniformly disposed on the washer both radially and circumferentially whereby cooling ducts are created between the pressboard washer and at least one of the adjacent disk coils so there will be adequate circulation of insulating fluid about the coil.

Such washers with spacer blocks glued thereto have been used for many years in the transformer art. The processing of these washers, however, has been tedious, time consuming and wasteful of shop space. As adequate circulation of cooling and insulating fluid through the coil may be affected by these washers and their spacer blocks, considerable importance is placed on the proper assembly of the washers. It has generally been considered necessary to use a template to accurately mark on the washers the proper position for each of the spacer blocks. Since the washers may be ten or twelve feet in diameter, it takes several man hours to glue several hundred blocks to a single washer. Then to heat and press the spacer blocks on the washers requires presses and relatively large ovens.

Having in mind the disadvantages of this prior practice of processing these washers, it is an object of this invention to provide an automatic machine by which spacer blocks are uniformly positioned and glued on large pressboard washers.

Another object of this invention is to provide an automatic gluing machine which holds a supply of stick type spacer blocks and automatically feeds individual spacer blocks to a glue applying apparatus and into a pressing apparatus while a relatively large pressboard washer is positioned to receive each spacer block in its predetermined position.

Still another object of this invention is to provide in an automatic gluing machine, for applying spacer blocks to a large washer by uniformly disposing the spacer blocks radially and circumferentially thereon, in which the radial and circumferential spacings of the spacer blocks applied to those washers may be varied at will.

And another object of this invention is to provide an automatic machine for applying spacer blocks to relatively large insulating washers for use in electrical winding stacks of transformers in which the washer is intermittently turned to predetermined positions and in which the spacer block feed, the gluing operation and the pressing operation are synchronized with the intermittent movement of the washer to be effected only while the washer is stationary.

It is the further object of this invention to provide an automatic gluing machine, for applying a relatively large number of spacer blocks to a relatively large insulating washer, in which the operation of the machine is stopped if there be an obstruction to the transfer of any of the spacer blocks to the pressing apparatus or if any one of the spacer blocks does not accurately and properly follow its intended course in being transferred to the pressing apparatus or if the spacer blocks in the supply device are exhausted or if a spacer block is not placed properly on the washer.

It is also an object of this invention to provide a machine for individually handling various size, relatively large insulating washers and for automatically applying spacer blocks to each of the large washers at positions exactly indexed whereby the washers of varying sizes are made so that they may easily be included in a common electrical winding of a transformer with the spacer blocks on all of the superposed washers exactly aligned to provide a strong winding structure with good ventilating ducts.

Still another object of this invention is to provide an automatic machine for gluing spacer blocks to relatively large insulating washers in which machine washers of various sizes may be successively processed with each washer exactly indexed on the machine and with the spacer blocks on all of the washers exactly positioned by the machine regardless of the sequence in which the washers of varying sizes are processed.

It has been found in accordance with this invention that the above mentioned objects can be achieved in a machine having a turntable on which relatively large washers of a great variety of sizes and configurations may each be individually, quickly and accurately disposed at an exactly indexed position with automatic means to alter the position at which successive spacer blocks are deposited on each washer by periodically moving the table with respect to an automatic handling means provided to draw spacer blocks from a supply hopper across a glue applying device to apply those spacer blocks at predetermined positions to the washer and with interrupting means provided for stopping the table movement and spacer block handling operation instantly in response to the occurrence of predetermined conditions which are detrimental to the proper operation of the machine or to the achievement of the desired placement of spacer blocks on the washer. This interruption of the machine operation is responsive to improper arrestment of any spacer block being transferred in the machine, of inadvertent displacement of position of a spacer block being transferred in the machine or of improper arrestment of movement of a spacer block to the washer carried on the table. And further, in a preferred embodiment of this invention there is provision for immediate annunciation and identification to the machine operator of any one of these interruptions.

Objects and advantages other than those above set forth will be apparent to those skilled in the art from the following description when read in connection with the accompanying drawing in which.

Figures 1, 1A, 2:
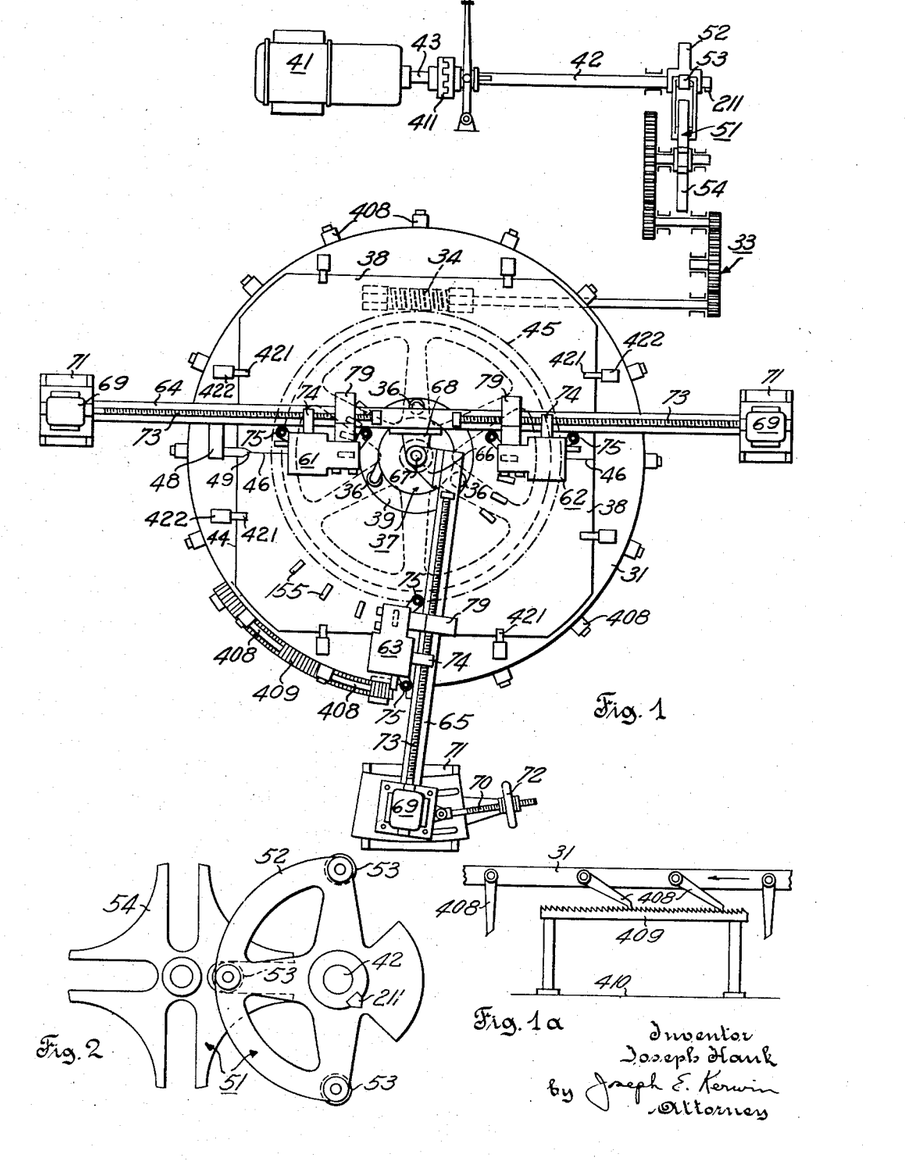
Fig. 1 is a plan view diagrammatically illustrating a machine made in accordance with the teachings of this invention, for applying spacer blocks to an insulating washer.
Fig. 1a is an elevation view of part of the table and antibacklash device therefor, shown in Fig. 1.
Fig. 2 is an elevation view of the Geneva movement adapted to rotate the turntable of the machine shown in Fig. 1 and to intermittently interrupt the rotation of that table while at least one spacer block is being applied to the washer carried by the table.

The machine illustrated in Fig. 1 includes a turntable 31 which is intermittently turned about its center by suitable means, as for example, by motor 41 which drives a Geneva gear movement 51. In this example, wheel 52 of the Geneva movement carries rollers 53 and is fast on extension 42 of motor drive shaft 43, and slotted wheel 54 of this movement is connected through an intermediate gear train 33 to worm 34 which meshes with a worm wheel 45 attached to the under side of the turntable. Preferably, the Geneva movement has three rollers 53 on wheel 52 which engage successive slots of wheel 54 to move the table through a predetermined angle in three continuous steps during three-quarters revolution of wheel 52 and shaft 42. The slotted wheel is not engaged by a roller during the fourth quarter of revolution of shaft 42 and is therefore idle and rotation of the turntable is stopped. The gear ratio of gear train 33 may be changed as desired to alter the angular movement of the turntable.

The machine shown in Fig. 1 has three headers or spacer block applying apparatus 61, 62, 63. Each of these is independent of the others but the component parts and operation of each are identical. Therefore, the the explanation of one header hereinafter given will suffice for as many as are embodied in the machine.

In the illustrated embodiment, however, the headers are not supported exactly similarly. Specifically, while two headers 61, 62 are supported on a common beam 64 that is fixed with respect to the shop floor by suitable means (not shown); the third header 63 is supported on a separate beam 65 which is adjustable on lines parallel to radii from the center of the turntable. To provide this adjustment which moves the third header with respect to the other headers and the table, the end of the second beam 65 has a lateral extension 66 pivoted on hinge pin 67 which is attached to beam 64 by bracket 68. The other end of beam 65 carries a motor 69 and is connected to the swiveled end of adjusting screw member 70. This other end of the beam rests on pedestal 71 which carries hand wheel 72 in which the adjusting screw is received to move the beam relative to the pedestal. The pedestal is, of course, fixed to the shop floor by any well known suitable means (not shown).

The beams are shown disposed with their lengthwise directions offset from the radii of the turntable for in the preferred embodiment shown the headers are disposed laterally of their respective beams so as to position spacer blocks exactly on radii of the turntable. Thus, the spacer blocks are always aligned radially of the center of the washer. The headers may be disposed to either side of the beams, and as viewed from the center of the table headers 61 and 62 are considered to be on opposite sides of beam 64.

Suitable means may be provided at the center portion of the turntable for accurately positioning the washer 38 on the table with the center of the round opening 39 in the washer coincident with the center of the turntable; for example, equally spaced rollers 36 which are part of centering head 37 may abut the edge of the round opening. In order to handle various size washers having different diameter openings at the center thereof, this centering head is made adjustable as will be explained in connection with the preferred embodiment of the centering head shown in Figs. 21–24.

Every washer processed by this machine must be properly indexed on the table so that all washers embodied in a transformer winding stack are exactly aligned with the spacer blocks on those washers accurately superposed over each other. All the washers must also have a common index. As is well known, the configuration of the many washers in a winding stack are varied depending on their particular position and they each generally have a straight edge which extends along portions of the iron core. For example, washer 38 has the straight edge 44. These straight edges may be utilized as a reference for providing a common index for the washers. Line 46 is scribed on washer 38 through the center of opening 39 perpendicular to edge 44. When the washer is placed on the table, its position thereon is adjusted until line 46 is substantially parallel to beam 64 and the center of the washer is substantially at the center of the table. Thus, the washer is indexed with respect to the other washers processed and the spacer blocks are uniformly disposed about the center.

Preferably, this indexing is accomplished with the aid of pointer 49 fastened to a permanent magnet 48 that is placed against the side of beam 64, which is made of magnetic material. This pointer is spaced from the face of the permanent magnet which abuts the beam a distance equal to the distance of the center of opening 39 from the beam. The washer is shifted about its center until line 46 is parallel to the beam as indicated by the pointer.

Since the washer is made of fullerboard or other cellulosic materials there may be instances when it absorbs sufficient moisture, after the central opening is cut therein and before it is processed on the machine, that line 46 cannot be exactly disposed parallel to the beam and also with the center of the opening exactly at the center of the table. In such instances, the slight eccentricity of the center of the opening of the washer is compensated for in the normal indexing so that the spacer blocks are uniformly disposed about the opening. The pointer is placed on the beam first at one end of line 46 and then at the other end of the line and the position of the washer is adjusted until the pointer has the same position relative to line 46 at the opposite ends of line 46.

Means are provided to move the headers along the beams radially of the center of the turntable. This means is illustrated for header 63 and beam 65 as motor 69, screw shaft 73 disposed lengthwise of the beam and nut 74 carried by the header. The screw shaft is driven by the motor and turns in the nut carried by the header, thereby resulting in movement of the header along the beam. Motor 69 is reversible, and the direction of movement of the header along the beam depends, of course, on the direction of rotation of the screw shaft. (An enlarged view of the screw shaft and nut are included in Fig. 6.)

Figures 6, 7:
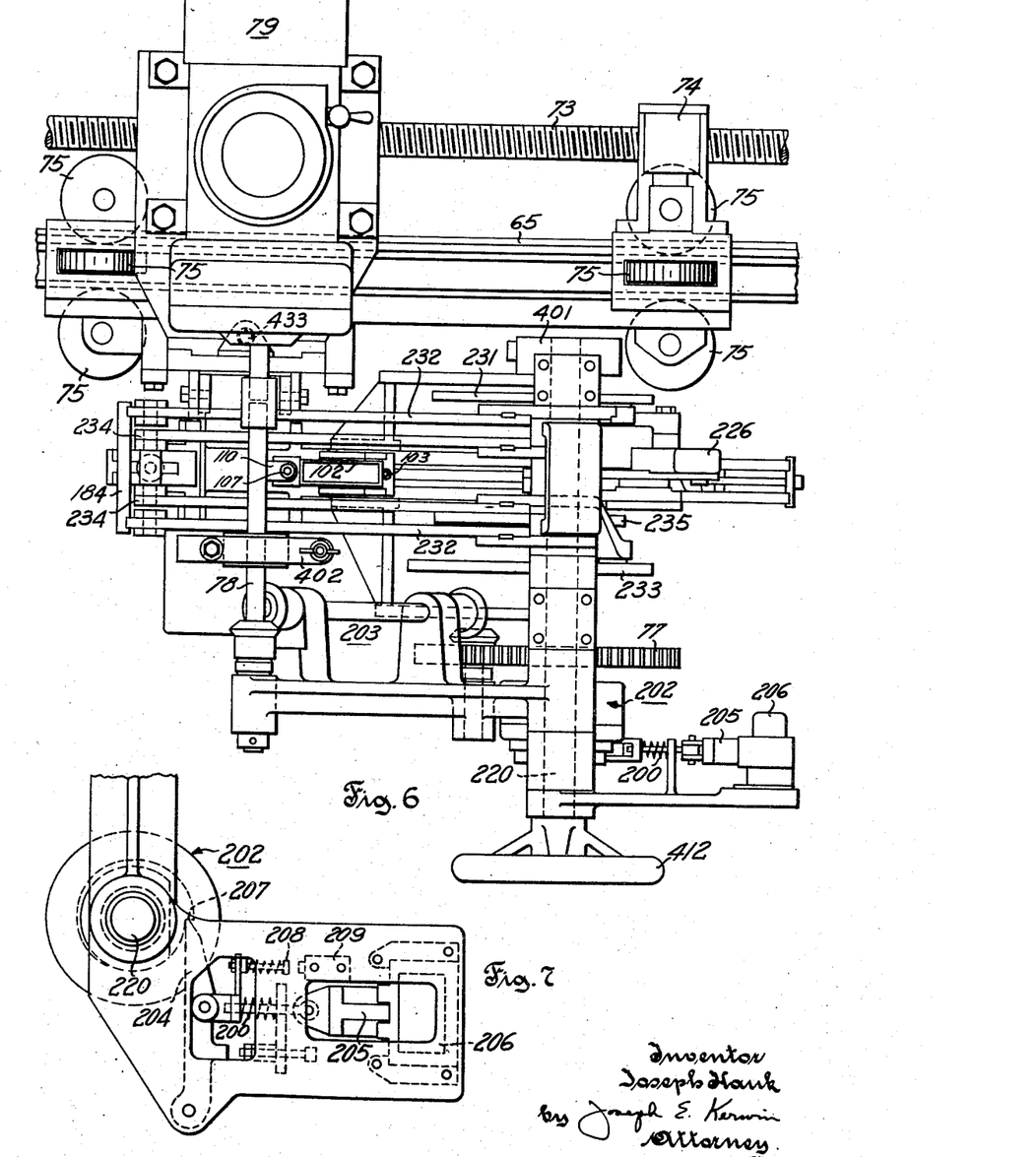
Fig. 6 is a plan view of one of the headers partly shown in elevation in Fig. 4.
Fig. 7 is an elevation view of a single revolution clutch and its solenoid controlled latch for operating the transfer apparatus and presser apparatus of a header through a cycle of its operation.
Figures 8, 9:
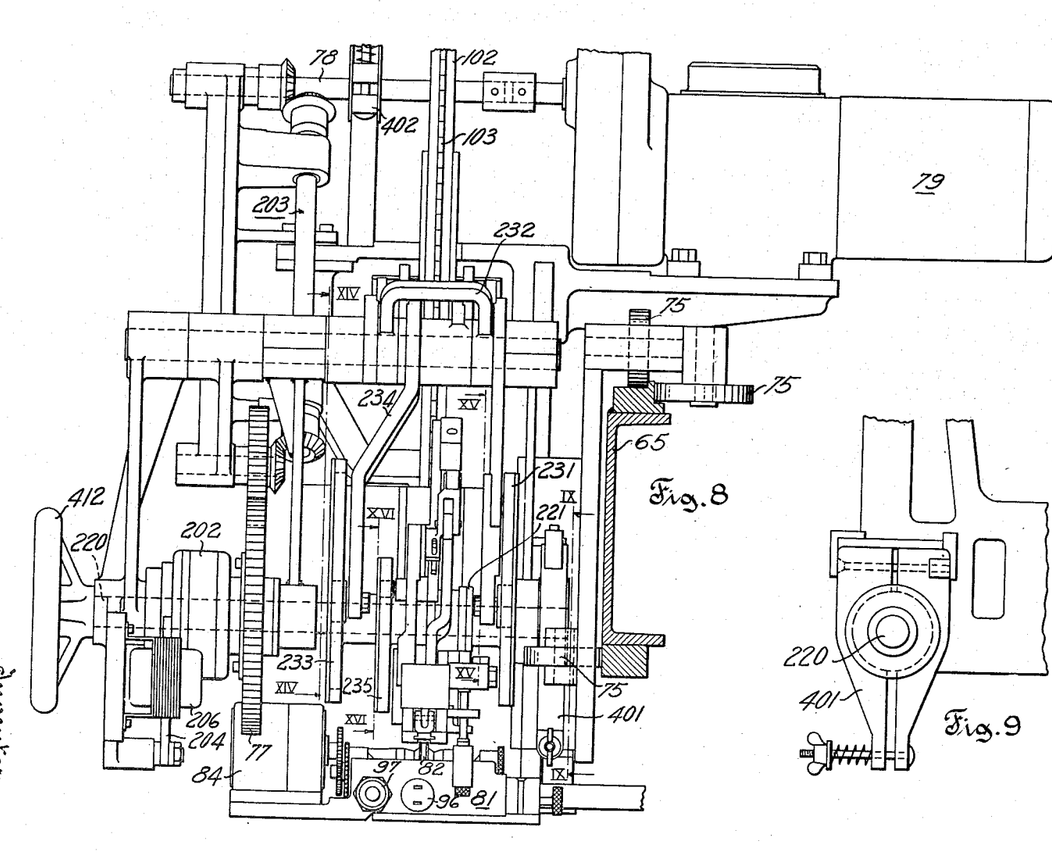
Fig. 8 is an elevation view of the header partly shown in Fig. 4, as seen from the right hand side thereof.
Fig. 9 is a side view of a cam shaft grip or brake taken along line IX—IX of Fig. 8.
Figures 10, 11:
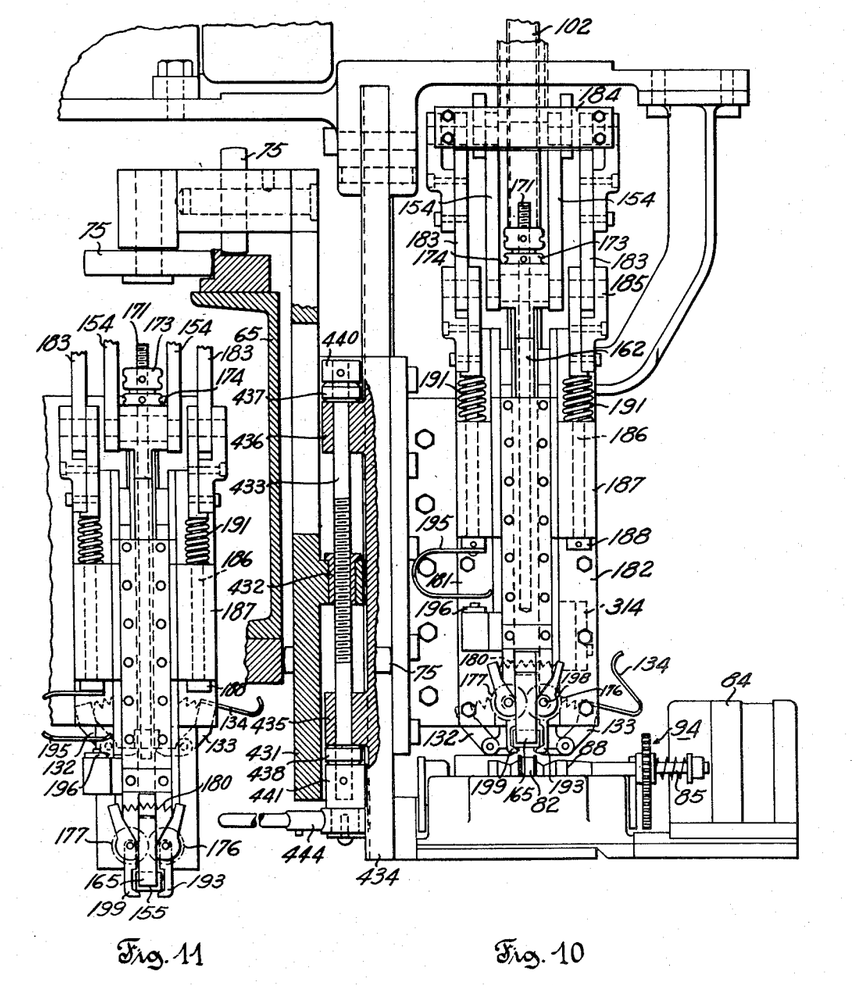
Fig. 10 is an elevation view of the presser apparatus and gluing apparatus as seen from the left hand side of the header shown in Fig. 4. For the sake of clearness of illustration the transfer apparatus has been omitted. In this view the presser apparatus is shown in its uppermost or spacer block receiving position.
Fig. 11 is a view of part of the mechanism shown in Fig. 10. In this view part of the presser apparatus is represented as moved to its lowermost position for applying a spacer to the washer.

The header moves along the beam on rollers 75. The preferred positions of these rollers in the header are best shown in Figs. 6, 8 and 10 from which it will be noted that there are two spaced groups of three rollers each. In each group one roller rides on top of the beam while the other two rollers ride on opposite sides of the beam.

Figure 3:
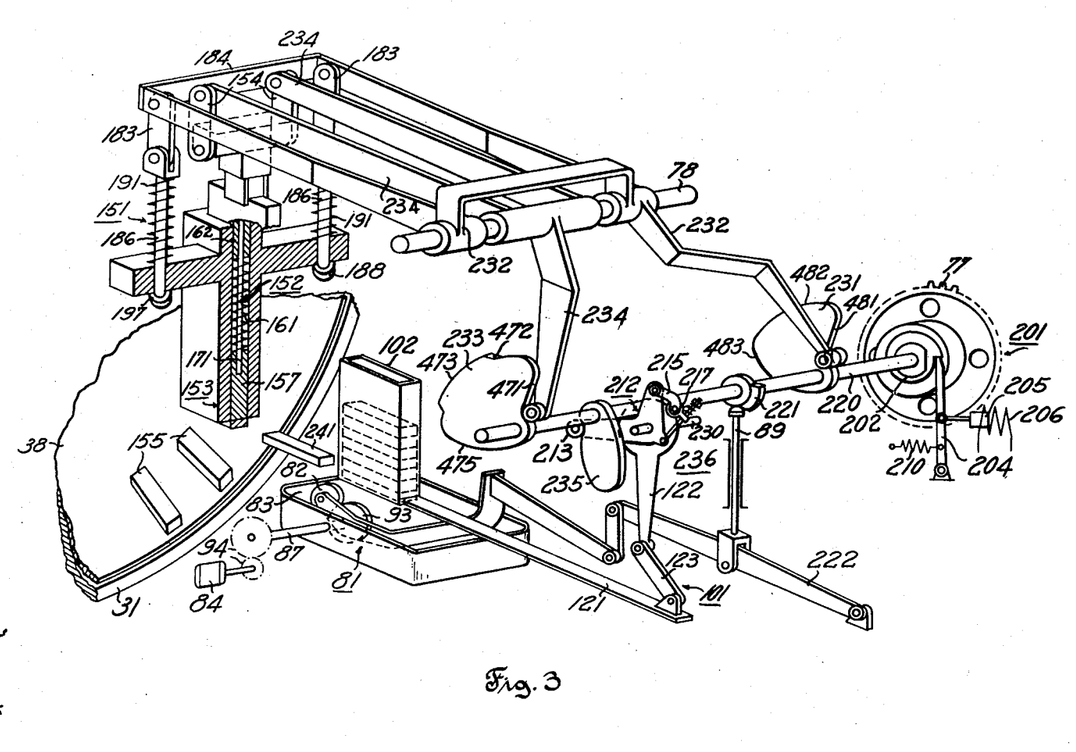
Fig. 3 is a schematic view showing the principal elements of the machine of Fig. 1 by which spacer blocks are individually applied to a washer carried by the turntable of that machine. In order to best show the operating principal of the machine the parts are illustrated in simplified manner.

The principal parts of a header are illustrated diagrammatically in Fig. 3. These parts comprise means for handling the spacer blocks and there are four parts identified as a transfer apparatus 101, a glue applying apparatus 81, a presser apparatus 151, and a driving apparatus 201. A cycle of operation of these parts is motivated by a continuously running motor not shown in Fig. 3 but included in the plan view, Fig. 6. Details of a preferred embodiment of these principal parts will be explained hereinafter in connection with this diagrammatic illustration and other figures of the drawing.

*Transfer apparatus*

Details of the preferred transfer apparatus are shown in Figs. 4, 5, 16 and 18 from which the relative position of that apparatus with respect to the other parts of the machine as a whole may be noted. The components of the transfer apparatus include a hopper 102 for holding a stack of spacer blocks superposed on each other, means for moving the bottom block of the stack from the hopper, and an intermediate device for holding the block removed from the hopper while glue is applied to the block and the block moving means clears the bottom of the hopper, thereby making it possible for another block to drop into position at the bottom of the hopper.

The hopper may hold a reasonable supply of spacer blocks. The number depends on the maximum height of hopper desired. The side pieces of the hopper are connected together by hinge pin 103 on the right hand vertical edge of the hopper as viewed in Fig. 5. The opposite, left hand vertical edge 104 has an opening 105 near its bottom, which extends up from the bottom a distance sufficient that the spacer blocks of maximum height may easily pass therethrough. The hopper is independent of the rest of the machine and can be easily removed to be refilled with blocks.

Since the minimum height of the spacer blocks for some washers may be less than half the height of the spacer blocks for other washers, the machine includes an adjustable means to reduce this opening in the hopper thereby preventing more than one spacer block from being ejected from the hopper at one time. This means may be part of the machine adjacent the hopper and therefore may be disposed as an element that cooperates with any of many hoppers had for the machine. For this purpose in the illustrated instance, there is a vertically disposed gate 106 to the left of the hopper 102 as viewed in Figs. 4 and 5. A knurled knob 107 is attached to a threaded member 108 on the upper end of this gate. The threaded member carries a locking nut 109 and is screw threaded in a bracket 110 fixedly attached to the frame 111 of the machine.

Figures 4, 5:
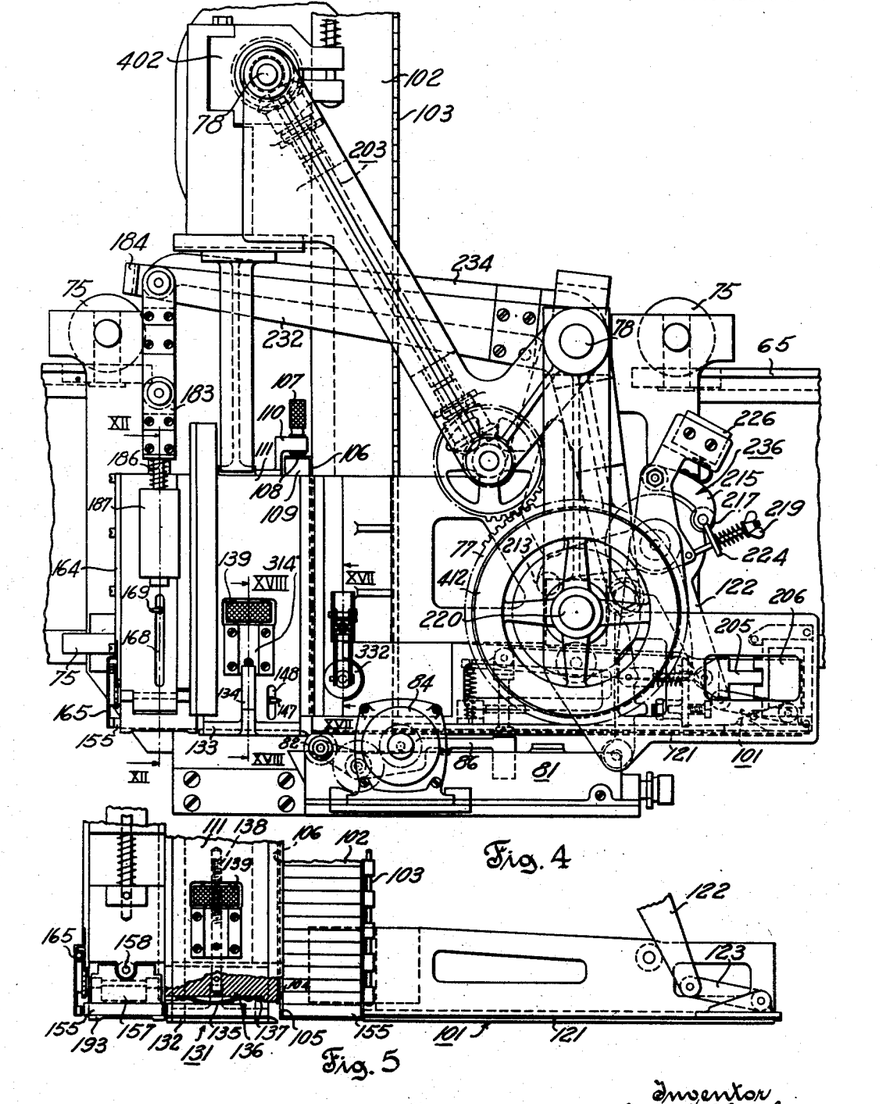
Fig. 4 is a side elevation of the feeder or transfer apparatus and presser apparatus of one of the headers of the machine shown in Fig. 1.
Fig. 5 is a partial view showing in elevation a portion of the transfer apparatus with a part thereof broken away.

The means for moving the bottom spacer block as can be seen in Fig. 5 constitutes rod 121 which may be reciprocated horizontally across the bottom of the hopper by crank arm 122 and link 123 which interconnects the rod and crank arm as an element of the driving apparatus of the machine. It should be noted that the rod 121 completely withdraws from beneath the spacer blocks in the hopper and therefore does not interfere with a spacer block dropping into the bottom position in the hopper.

Figures 16, 17, 18:
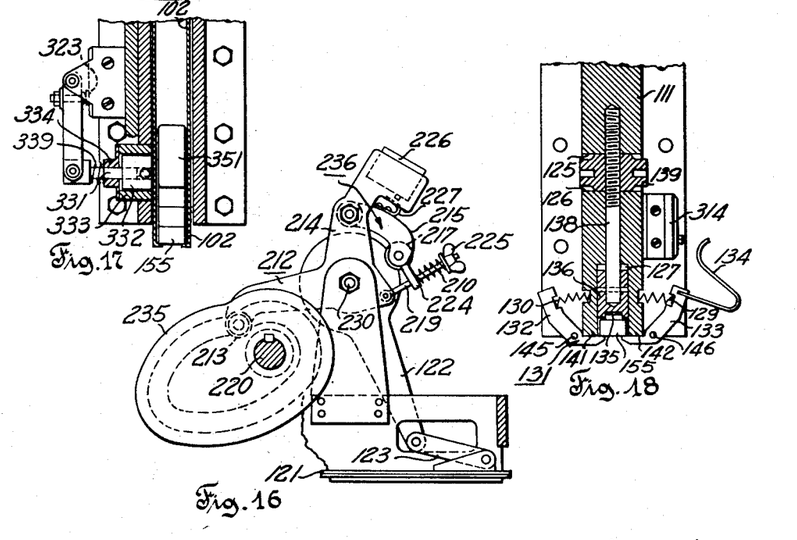
Fig. 16 is an enlarged view taken along line XVI—XVI of Fig. 8 showing the cam and cam follower of the transfer apparatus.
Fig. 17 is an enlarged sectional view taken along line XVII—XVII of Fig. 4 showing part of the hopper and its supply indicator mechanism.
Fig. 18 is an enlarged sectional view taken along line XVIII—XVIII of Fig. 4 showing the intermediate position spacer block holding device.

The intermediate device 131 for holding a spacer block that has been moved from the bottom of the hopper is shown in two views in Figs. 5 and 18. This device has a passageway substantially aligned with the bottom of the hopper so a spacer block may move into that passageway without lateral displacement. This passageway is defined by lower ends of suspension arms 132, 133, sides 141, 142 of frame portion 111 and leaf spring 135. The spacer block in this intermediate position device is held by resting on tapered brackets at the lower ends of the suspension arms and being firmly pressed by the spring.

This intermediate device includes adjusting means for accommodating spacer blocks of varying heights. The leaf spring is carried by bar 136; preferably one end of the spring is fastened to the bar by rivets 137. The lower end of bolt 138 is embedded in the bar, and the upper end portion of bolt 138 has a nut 139 associated therewith. This nut is confined between spaced shoulders 125, 126 in the frame portion of the machine. When the nut is turned the bar is jacked up or down in slot 127 of the frame portion to increase or diminish the height of the passageway. Nut 139 is accessible to be turned by hand or by a small tool in a well known manner.

The suspension arms of the holding device are each pivotally mounted intermediate their respective ends on pins 145, 146 carried by the frame portion. These pivoted arms also constitute part of an automatic control for stopping operation of the machine. If a spacer block forces the arms to pivot, the machine will stop as explained hereinafter.

A visual means is provided for indicating the position of this adjusting member of the intermediate holding device. The frame portion 111 has a vertical slot 148 therein and a pin 147 is fastened (not shown) to the adjusting block and extends laterally therefrom as viewed in Fig. 4. The pin is so disposed as to extend through the vertical slot in the frame portion.

*Gluing apparatus*

The side view of the machine (Fig. 4) also shows the position of the gluing apparatus 81 with respect to the transfer apparatus, and in Figs. 8 and 10 the lower part of the machine includes a showing of the gluing apparatus from the opposite ends thereof. That apparatus, however, is best understood in connection with the elevation and plan views of Figs. 19 and 20. Liquid glue is applied to the bottom of spacer blocks as they move from the hopper to the intermediate device. In this embodiment a rotating wheel 82 is periodically raised to apply the adhesive to the spacer blocks. Contrawise, this wheel is periodically lowered to be out of the way of the spacer blocks when their movement to the intermediate device has stopped. This adhesive applying wheel 82 is fast on drive shaft 85 which is carried by the left hand bifurcated end of rocking arm 86, the bifurcated end constituting spaced bearings 88 for that drive shaft. Rocking arm 86 pivots about shaft 87 which has fast thereon a glue transfer wheel 93 disposed between the bifurcated end portions of the rocking arm.

Figure 19:
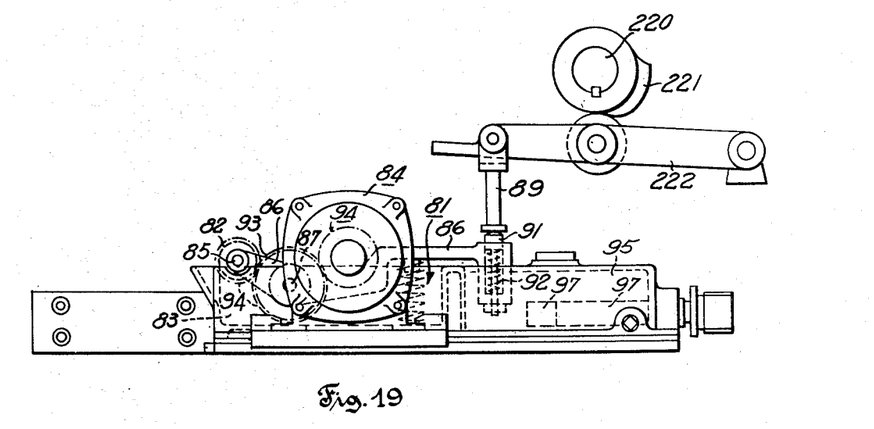
Fig. 19 is an enlarged elevation view of the gluing apparatus including a diagrammatic showing of the cam and cam follower therefor.

The means illustrated for periodically raising and lowering the adhesive applying wheel is cam operated and acts on the right hand end of lever 86. This lever is abutted by a vertically disposed push rod 89 which is reciprocated in response to cam 221 through pivoted cam follower 222 of the driving apparatus. Push rod 89 abuts plunger 91 which is spring biased at 92 to keep the cam follower in contact with the cam and to keep the lever from displacing a spacer block when the rotating wheel is raised and contacts the bottom of the spacer block.

Figure 20:
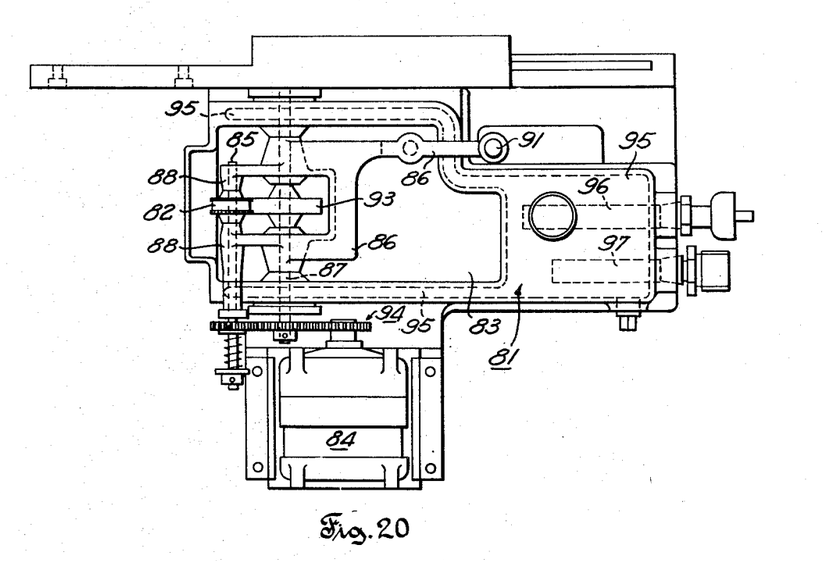
Fig. 20 is an enlarged plan view of the gluing apparatus shown in Fig. 19 with the cam and cam follower not shown.

Shafts 85 and 87 are driven through gear train 94 by motor 84. Preferably, this motor is continuously running keeping the transfer wheel and glue applying wheel always rotating. Transfer wheel 93 is partially immersed in the glue and will carry glue on its periphery transferring some of that glue to wheel 82. This glue applying wheel 82, has serrated edges between which glue is carried with the extra glue spilling out between the serrations so that there is a substantially constant level of glue on this wheel when it is raised to a spacer block. This assures the deposit of a substantially predetermined amount of glue evenly along the bottom of each spacer block. Preferably, glue is applied to a narrow central portion along the entire length of the bottom of the spacer blocks. The pressing of the spacer blocks on the washer will force glue and spread glue over the entire bottom surface of the blocks.

The machine is designed for continuous operation in a production manufacturing process and it is desirable to keep the adhesive agitated and at a constant temperature. Therefore, the liquid glue in the tank is heated, preferably electrically. The preferred means for maintaining the liquid glue temperature constant is illustrated as a water jacket 95 which has disposed therein an electric heater 96 and thermostat 97 for controlling the heater.

*Presser apparatus*

The presser apparatus 151 includes means for holding a spacer block, means for lowering the spacer block to the washer and, of course, means for pressing the spacer block as it is applied to the washer. In this embodiment there is an inner ram device 152 and an outer ram device 153 as viewed in Fig. 3 for placing and pressing a spacer on the washer.

Figure 12:
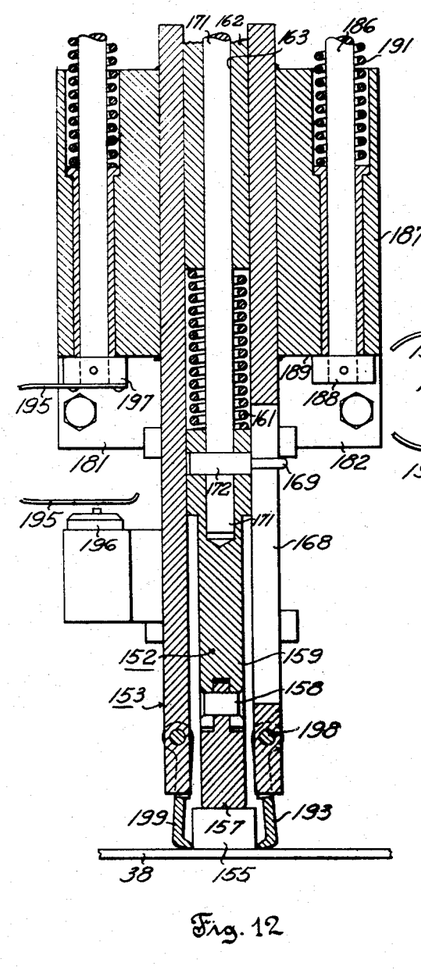
Fig. 12 is an enlarged sectional view taken through the presser apparatus along line XII—XII of Fig. 4 with the position of that apparatus displaced to its lowermost position and shown at approximately the start of the spacer block pressing cycle.
Figure 13:
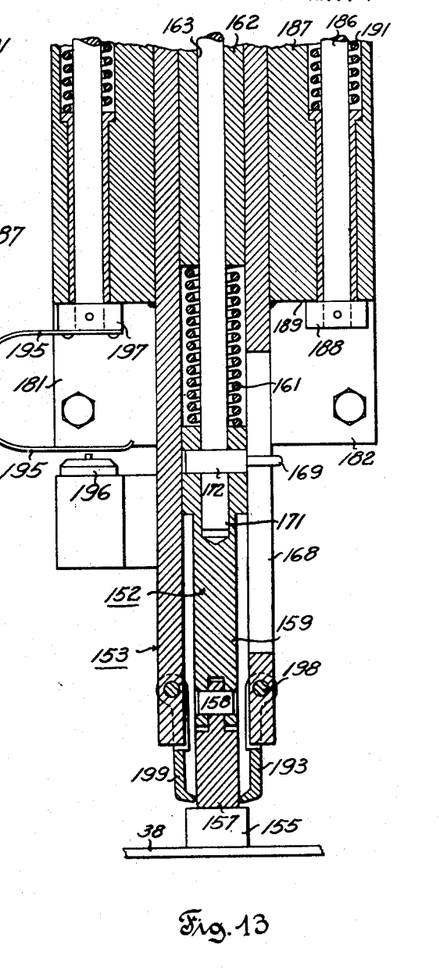
Fig. 13 is another enlarged sectional view also taken along line XII—XII of Fig. 4. The position of the presser apparatus is displaced showing that apparatus at approximately the end of the pressing cycle.
Figure 14:
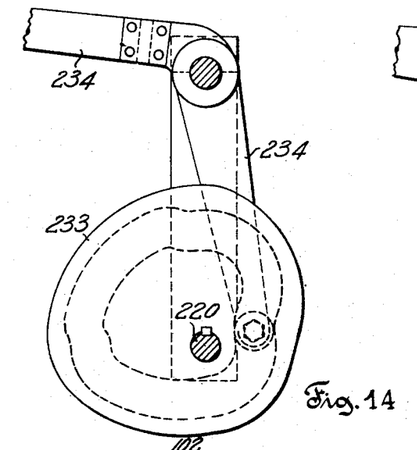
Fig. 14 is an enlarged side elevation taken along line XIV—XIV of Fig. 8, showing the cam and part of the cam follower for effecting operation of a first part of the presser apparatus.
Figure 15:
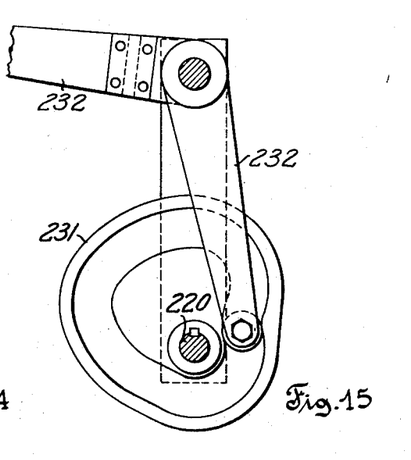
Fig. 15 is an enlarged side elevation taken along line XV—XV of Fig. 8 showing a cam and follower for effecting operation of a second part of the presser apparatus.

The upper end of the inner ram device 152 is attached to downwardly extending elements or links 154 of the driving apparatus, and as can best be noted from Figs. 12 and 13, the lower end of this inner ram is bearing against the upper surface of a spacer block 155. As will be described hereinafter, the driving apparatus moves the ram device down and up during a cycle of operation of the machine. Preferably, this inner ram device presses evenly on the upper surface of the spacer block, has resilient means to absorb some of the stroke of its associated driving apparatus element, and has means to adjust its extended length to accommodate the different heights of various spacer blocks.

The lower tip 157 of the inner ram device is joined to its lower part 159 by rivet 158 such that there is some swivel action between the tip and lower part and the ram therefore presses evenly on the upper surface of the spacer block.

The force of the driving apparatus is transmitted to lower part 159 through a coil spring 161 confined between that lower part and the ram upper part 162 attached to downwardly extending links 154. This spring provides resilience between the ram members to take care of reasonable tolerance in height of the spacer blocks that are applied to any one washer. For example, if the lower part of the ram causes the spacer block to contact the washer before the upper part of the ram has been moved to its extreme lowermost position by the driving apparatus, the parts of the ram or driving apparatus will not be damaged. Instead the upper part of the ram will merely compress the spring in a smooth continued operation during the cycle of operation of the driving apparatus. There need not be further movement of the lower part of the ram.

For adjusting the extended length of the inner ram there is a bolt 171 which has one end thereof fastened by suitable means, such as pin 172, to lower part 159 and its other upper end projected through a longitudinal opening 163 in upper part 162. An adjusting nut 173 is screw threaded to bolt 171 and abuts a lateral shoulder 174 of the upper part.

The outer ram device 153 consists of two similar elements 181, 182 disposed on opposite sides of the inner ram. The mechanical parts of these two elements are similar and a description of the main parts of the element to the right of the inner ram, as viewed in Figs. 10 to 13, will suffice as a description of the main parts of both elements.

Depending link 183 attached to a swinging framework 184 of the driving apparatus is connected to a clevis type upper part 185 of the ram element 182. Extending downwardly from this upper part is a connecting rod 186 which extends through a vertical passage in lower part 187. The bottom of this connecting rod has a lateral portion or head 188 that abuts the lower edge surface 189 of lower part 187. Spring 191 surrounds rod 186 and is disposed between the upper and lower parts. The lowermost portion of lower part 182 carries a hanging arm 193 freely pivoted on pin 198. And at the bottom of that hanging arm a bracket extends laterally toward the similar arm 199 of element 181. This bracket preferably is tapered. Spacer block 155 is held between these lateral brackets of the hanging arms and the lower tip of the inner ram.

The two hanging arms 193, 199 are caused to pivot when spacer block 155 is pressed onto a washer. In order that the brackets of those arms will move uniformly away from beneath the block, each arm 193, 199 has fastened thereto a gear 176, 177, respectively. These are meshed to each other, and when one arm pivots the other simultaneously pivots. The arms have upward extensions and a spring 180 is disposed therebetween to bias the lower tips of those arms toward each other.

Means for stopping operation of the machine is carried by the outer ram device. Preferably, this is carried by only one of the outer ram elements. In this embodiment element 181 carries this means which is illustrated as contact engaging spring member 195 (fixed to connecting rod head 197) and switch 196.

The depending links 183 of the driving apparatus which connect to the two elements 181, 182 of the outer ram are part of a unitary framework. Therefore the operation of the two elements of the outer ram device are identical and simultaneous.

Since the outer ram device elements are disposed on the opposite sides of the inner ram, suitable means is provided for indicating the position of the lower part of the inner ram. Thus, adjustment of the lower part of the inner ram can accurately be made even though the tip of the element is hidden from view. For this purpose a longitudinal slot is made in the lower portion of one of the elements of the outer ram device. This slot 168 is in right hand element 182 as viewed in Figs. 12 and 13. A laterally extending pin 169 is fixed to the lower part of the inner ram so as to ride in this vertical slot to be seen when adjustment is being made of the lower part of the inner ram device.

The face plate 164 attached to the inner ram device carries an abutment 165 at its lower end. This abutment is disposed in the path of the spacer block transferred from the intermediate holding device to the presser apparatus (Figs. 4, 5 and 10) and prevents movement of the spacer block beyond its desired location in the presser apparatus.

*Driving apparatus*

In describing the transfer apparatus, the presser apparatus and the gluing apparatus, mention has been briefly made of associated parts of a driving apparatus. These associated parts are all cam follower elements, the movement of which is effected by cam shaft 220 which is periodically caused to turn a complete cycle of 360°. Turning of the cam shaft is preferably an electrically controlled operation, and motor 79 which is continuously running while the machine is in use is engaged through clutch 202 with cam shaft 220. A suitable gear train 203 is provided between motor 79 and clutch 202 which is a conventional single revolution clutch having a latch 204 attached for operation to an armature 205 of solenoid 206 (Fig. 7).

This armature is spring loaded to hold the latch in locking position abutted to notch 207 when the solenoid is deenergized. An abutment 208 is carried by the armature for engagement with a solenoid circuit interrupting switch 209 to deenergize the solenoid so that the spring 200 will pull the armature away from the solenoid and force the latch into engagement with notch 207.

Figure 25:
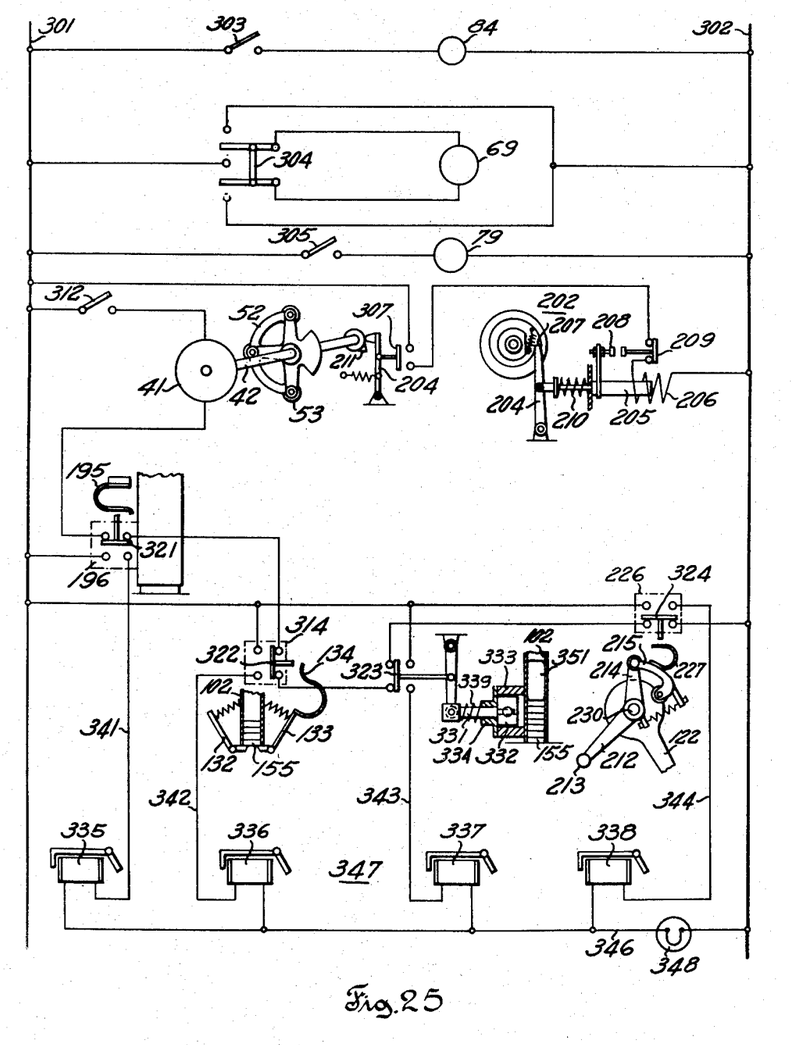
Fig. 25 is a wiring diagram schematically showing the various motors included in the one of the headers of the machine illustrated in Fig. 1, showing circuit interrupting devices for stopping operation of the machine on the occurrence of an irregularity in the automatic processing of the spacer blocks.

The circuit for the solenoid 206 is shown in Fig. 25 and from the description hereinafter given of that circuit it will be noted that cam 211 on shaft 42 (Fig. 2) effects synchronization of the Geneva movement with the turning of the cam shaft as cam 211 periodically closes contact 322 in the solenoid circuit.

Cam 231 and its bell crank type follower swinging framework 232 effect operation of the outer ram device through its cycle as the cam shaft is rotated once. The depending links 183 which are connected to both outer ram elements are simultaneously operated by cam 231.

Cam 233 and the bell crank type swinging framework 234 which constitutes a follower of cam 233 operate the inner ram device.

Cam shaft 220 also has cam 235 attached thereto. This cam and its cam follower 236 operate the transfer rod 121. Follower 236 includes means for arresting movement of transfer rod 121 if that rod meets with an obstruction in its movement. The cam follower comprises bell crank 212 which carries roller 213 that rides in the cam groove, a clamping arm 215 which is pivoted at one end medially of arm 214 of bell crank, crank arm 122 and a releasing or arresting means which under normal circumstances holds roller 217 carried by the clamping arm in an arc shaped recess in the periphery of the upper end of crank arm 122. The roller on the clamping arm is pressed into the arc shaped recess and held therein by bolt 219, spring 210 and fastening means 225. Bolt 219 has one end swiveledly attached to bell crank 212, extends through extension 224 of the clamping arm, and has fastening means 225 attached to its other end. Spring 210 is confined between the extension and the fastening means. Thus, the clamping arm provides a releasable means between bell crank 212 and crank arm 122. However, both the bell crank and the crank arm will normally rotate together about a common shaft 230 in the following cam 235 until such time as the movement of the connecting rod is hindered to such extent that the force of spring 210 is overcome causing roller 217 to dislodge from the arc shaped recess in the upper end of the crank arm.

The upper end of arm 214 of the bell crank carries a switch 226, and the clamping arm has riveted thereto a spring member 227 disposed normally out of engagement with the switch but to engage the switch when the roller of the clamping arm is dislodged from the recess in the crank arm. Switch 226 is so connected in the wiring circuit of the machine that engagement of spring member 227 with the switch will stop the machine as will be explained hereinafter in connection with the wiring circuits of Fig. 25.

Cam shaft 220 also has fast thereon cam 221 for effecting movement of the element of the driving apparatus that raises and lowers the glue applying wheel 82. This cam need not be grooved for holding its follower as spring 92 is effective to keep push rod 89 and other parts of cam follower 222 engaged with each other and in contact with the surface of cam 221.

*Electrical circuits*

Starting at the top of Fig. 25 illustrating the wiring diagram for the machine, there is first illustrated the circuit for the gluing device. This comprises motor 84 and on-off switch 303 in series with the motor between electrical source lines 301, 302.

Beneath the gluing device circuit is illustrated the circuit for motor 69 which moves header 63 along beam 65. This motor is reversibly connected through switch 304 to the electrical source lines 301, 302.

The next circuit is that for motor 79 of the driving apparatus. As mentioned above, this motor is continuously running when the machine is in operation. Therefore, the circuit merely includes on-off switch 305 in series with motor 79.

Below the circuit for motor 79 are the circuits for solenoid 206, for motor 41 and for visual indicator 347.

First is the solenoid circuit. It includes in series between lines 301, 302, normally open contact 307 which is closed by cam 211 once each revolution of wheel 52, the normally closed contact of switch 209 which is opened by abutment 208 each time solenoid 206 is energized and attracts armature 205.

In the circuit of motor 41 there are in series four normally closed contacts, 321, 322, 323 and 324, and manual on-off switch 312. These four normally closed contacts are part of four electrical safety devices incorporated in the machine as means to interrupt operation of the handling means or header in response to certain conditions to be explained in connection with these normally closed contacts. Normally closed contact 321 is embodied in switch 196 carried by the outer ram and opens if the outer ram does not move downwardly its full travel as when a second spacer block is accidently placed on top of a spacer block already glued to a washer. Normally closed contact 322 is embodied in switch 314 carried by the intermediate position holding device of the transfer apparatus and opens as a result of any pivoting or lateral displacement of a suspension arm of the intermediate position holding device. Normally closed contact 323 is connected by suitable linkage to armature 331 of permanent magnet 332 associated with the hopper and is caused to open when the supply of spacer blocks in the hopper is low. And normally closed contact 324 is embodied in switch 226 carried by the release means of the transfer apparatus cam follower and is caused to open if there is an obstruction in the path of the horizontal transfer rod.

Each of these four normally closed contacts are part of switches which have normally open back contacts that are closed when the motor circuit is opened. The normally open back contact of each of these switches is in series with one of four electrical annunciators 335, 336, 337 and 338. These are four branch indicator circuits 341, 342, 343 and 344, in parallel between conductors 301 and 346. A set of normally open contacts and an annunciator is in series in each of those four parallel branches. Those four branches are connected to a common conductor 346 which includes a red signal lamp 348 and connects to conductor 302. If any of the four safety switches is caused to have any of its normally open back contacts closed, an annunciator will be energized to identify the particular place in the machine where there is trouble and lamp 348 will be lighted to immediately attract the attention of the operator. Also, and at the same time, of course, the circuit of motor 41 is opened preventing further operation of the machine until the trouble is corrected.

The safety switch associated with the transfer apparatus is described briefly above, and its operation is, of course, responsive to operation of the release means of the transfer apparatus cam follower. Specifically, dislodgment and movement of the roller of clamping arm 215 moves contact 324. The dislodged or moved clamping arm will ride on the circular periphery of the upper end of crank arm 122 which keeps the spring member carried by the clamping arm cammed to the switch 226.

The means for indicating a low supply in a hopper comprises a piece of steel or other suitable magnetic material 351 which rests freely on top of the spacer blocks in the hopper which preferably is of nonmagnetic material such as brass. This piece moves down the hopper as the spacer blocks are ejected therefrom, and when this piece is adjacent the permanent magnet 332, the permanent magnet and its arm 331 are attracted toward the steel piece whereby contact 323 attached to the arm 331 is moved. This opens the motor circuit and closes the indicator circuit. When the steel piece is moved away from being closely adjacent the permanent magnet, as when the hopper is withdrawn and refilled, the permanent magnet may be moved to its normal position so that the contact 323 closes the motor circuit and opens the indicator circuit. The permanent magnet preferably is disposed in a brass collar 333 in which it may move laterally. As viewed in Fig. 17, the left end of the collar is partially closed by steel ring 334. The permanent magnet is attracted to this steel ring so that contact 323 is closed in the motor circuit unless piece 351 is near the bottom of the hopper. Spring 339 biases arm 331 to aid in returning the permanent magnet to its normal position whereby contact 323 is closed in the motor circuit.

When a spacer block is moved to the intermediate holding device, it may accidentally be turned improperly. In such instance the spacer block will cause suspension arm 133 to pivot, bringing spring member 134 into engagement with switch 314, thereby moving contact 322 embodied in the switch and opening the motor circuit. The upper ends of suspension arms 132 and 133 are biased by springs 129 and 130, respectively, to return those arms to their normal positions moving spring member 134 from engagement with contact 322 which will then close in the motor circuit.

The fourth normally closed contact 321 is associated with the outer ram device and is embodied in switch 196 attached to the lower portion of element 181; spring member 195 for moving contact 321 is attached to connecting rod head 197. If the lower portion of the outer ram is stopped before it reaches its full downward travel, the driving apparatus may continue to move the connecting rod downward, thereby forcing member 195 to move contact 321.

*Other features*

A preferred embodiment of the centering head 37 shown in the diagrammatic view of Fig. 1 is illustrated in Figs. 21 to 24. The center portion of table 38 is recessed to accommodate a disk shoulder 251 of the centering head. While the periphery of this shoulder is perpendicular to the surface of the table and abuts the edge of the recess so that the centering head does shift laterally of the table, cap screws 252 are provided for suitably fastening the base 253 of the centering head to the table 31. The centering head has three movable arms 254, 255, 256, which carry rollers 36 on their extreme ends. Each of these rollers turns on a vertically disposed journal the upper end of which is fastened to the arm, for example journal 257 is connected to arm 256 by a lateral pin 258.

Figure 21:
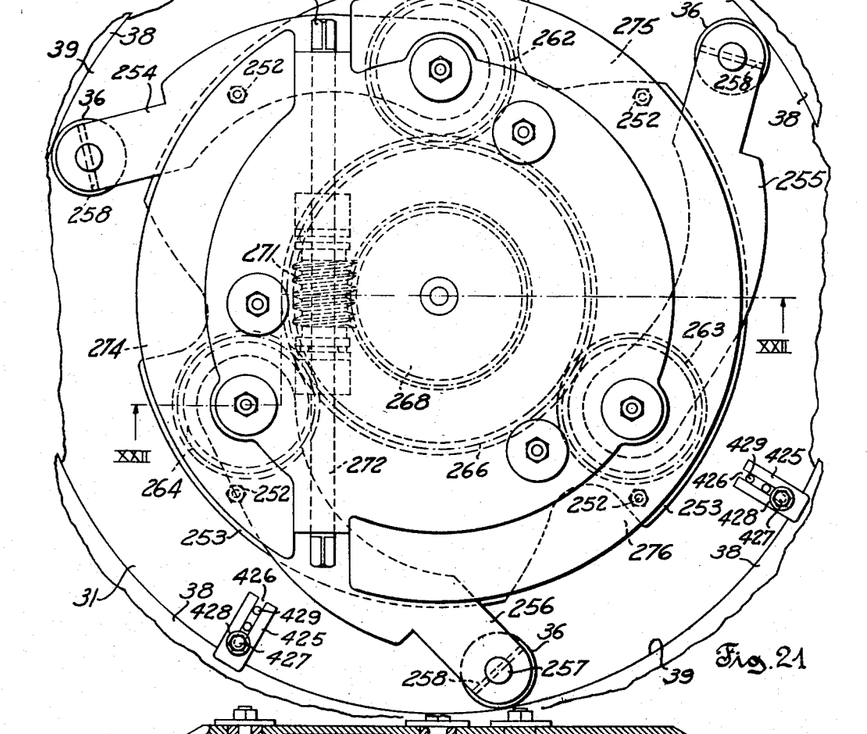
Fig. 21 is a plan view of a preferred embodiment of the centering head identified by reference character 37 in Fig. 1.
Figures 22, 24:
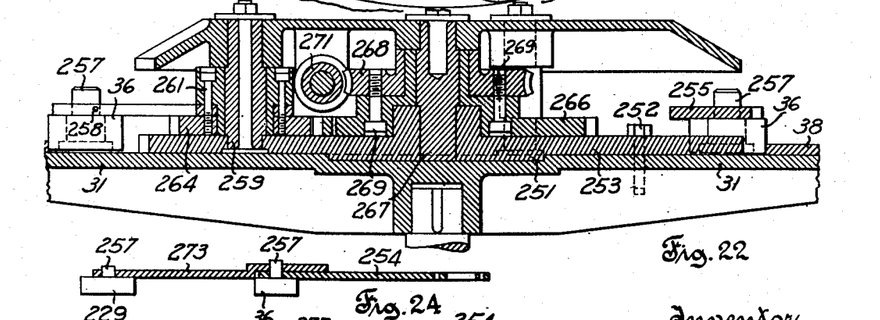
Fig. 22 is a sectional view taken along line XXII—XXII of Fig. 21.
Fig. 24 is a sectional view taken along line XXIV—XXIV of Fig. 23.

Suitable means is provided for simultaneously moving these arms toward or away from the center of the table. In moving outwardly the arms press with equal force against the inner edge of the washer defining its central opening, regardless of the size of that opening. These arms as shown are of identical construction. For example, arm 256 is pivotally mounted on a pin 259 and has a pinion 264 fastened to it by cap screws 261. The three pinions 262, 263 and 264 attached to the inner ends of the three arms are disposed 120° apart and mesh with a common drive gear 266 which is journaled on pin 267 at the middle of the centering head. A worm wheel 268 is attached to this drive gear by suitable means such as cap screws 269, and there is a worm 271 which engages with the wheel to rotate the drive gear. And crank shaft 272 carries the worm fast thereon. This shaft extends in opposite directions from the worm and has squared ends to be engaged by a crank handle (not shown) whereby the operator of the machine may turn the worm to move the three arms toward or away from the center of the table. The base of the centering head is notched at 274, 275, 276, to receive the three rollers 36 when the arms are moved to their position nearest the center of the table whereby the centering head may be used in conjunction with a washer which has a central opening substantially no larger than the base of the centering head.

Figure 23:
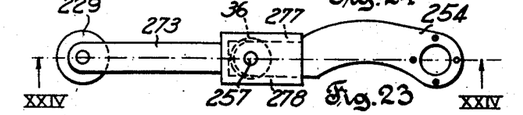
Fig. 23 is a plan view on a reduced scale of one of the three pivot arms of the centering chuck shown in Fig. 21, with an extension connected to the pivot arm.

In order to accommodate washers having quite large central openings, an extension 273 may be added to each of the arms. Suitable fastening means is provided to attach the extension to the arms and is illustrated as an upstanding portion of journal 257 near the extreme end of the arm onto which one end of the extension is closely fit. This end of the extension has a hole in which the upstanding journal portion projects and the opposite sides of the end portion of the extension have downwardly extending flanges 277, 278 which closely fit the opposite sides of the extreme end portion of the arm 254. The other end of the extension carries a roller 229 of any suitable size which rests on the surface of the turntable to be abutted against the inner edge of the washer. The diameters of the rollers carried by the arms or by the extensions are also a factor in determining the size of opening that the washers may have. In other words, if the radius of these rollers is quite large the greater portion of that radius in itself becomes an extension of the arm. Therefore, rollers of varying sizes may be utilized.

Another feature of the machine illustrated is braking means to prevent backlash, an antibacklash means. Friction brakes 401, 402 are provided for cam shaft 220 and drive shaft 78 of motor 79, respectively. These are illustrated in Figs. 8 and 9. And as an antibacklash means for preventing reversal of movement of the table when it is stopped so the spacer blocks may be quickly and properly disposed on the washer, there are pawls 408 (Figs. 1 and 1a) which hang from the periphery of the table 31 and a ratchet 409 fastened to the shop floor 410. The pawls are circumferentially spaced about the table so that at least two pawls are always engaged with the ratchet. When the table movement is interrupted the pawl and ratchet will stop backlash of the table.

Still other features of the illustrated machine are manual operated devices. These include clutch 411 for manually disengaging extension shaft 42 from motor drive shaft 43 (Fig. 1) and hand wheel 412 for turning the cam shaft 220. The extension shaft may be disengaged when the gear ratio is changed and the cam shaft may be turned when a new pressboard washer is placed on the table or when the gear ratio is changed.

Suitable means are provided to fasten a washer to the table top. For example, there may be spring strips 421 that have a permanent magnet portion 422 holding them to the magnetic table top as shown in Fig. 1. In addition to those spring strips there may be one or more clamping means of a more permanent nature such as shown at the inner circular edge of the washer in Fig. 21. This means preferably includes a clamping plate 425 having a longitudinal slot 426 that overlies the edge of the washer 38, a bolt 427 and a washer 428 between the bolt head and the plate. The table is provided with a series of threaded holes 429 into any one of which the bolt may be screwed. These threaded holes are disposed at varying distances from the center of the table so that the clamping plate may overlie washers having varying sized central openings.

Means are provided in the machine for adjusting the height of a header, that is the position of the header with respect to its associated beam and the table. This is best shown in Fig. 10. Carriage 431 to which the header rollers 75 are attached has a lateral member 432 in which a threaded adjusting spindle 433 is vertically disposed. Frame member 434 is vertically disposed. Frame member 434 of the header has laterally extending ears 435, 436 through which the opposite end portions of spindle 433 extend. Stop collars 440 and 441 are fastened to the opposite ends of the spindle. These collars are spaced from the lateral ears and bearings 437 and 438 are disposed between the ears and the collars. The lower collar is engaged by a wrench 444 whereby the spindle may be turned, if the height of the rams above the table is desired to be adjusted or if the height of the rams with respect to the beam is desired to be adjusted.

*Operation*

The operation of this machine is automatic. Motor 41 rotates the turntable 31 a predetermined angle determined by the distance desired between adjacent spacer blocks. In the illustrated instance, this angular movement of the table involves three successive continuous steps of the slotted wheel 54 of the Geneva movement. That is, in three quarters of the revolution of drive shaft 43 the turntable is rotated through that predetermined angle. During the final quarter revolution of drive shaft 43, slotted wheel 54 is idle, and the turntable is stopped. At the beginning of this third quarter of revolution of the drive shaft, cam 211 carried by wheel 52 moves and closes contact 307, thereby energizing solenoid 206 which attracts armature 205 releasing latch 294 from notch 207 of the one revolution clutch. Gear 77 of the gear train driven by motor 79 is thereby connected to cam shaft 220 by clutch 202, and one revolution of cam shaft 220 is effected before latch 204 reengages with notch 207 of the clutch. Reengagement of the latch with the notch upon a single revolution of the cam shaft is insured by providing an abutment carried by armature 205 which strikes switch 209 opening its normally closed contact in the solenoid circuit thereby allowing spring 210 to return the latch to engage with the notch.

Rotation of cam shaft 220 through one revolution completes a cycle of operation of a machine. This cam shaft carries four cams 221, 231, 233, and 235. Since these cams are fixed to a common shaft, they are synchronized to operate the apparatus of the machine. The cycles of operation of the transfer apparatus 101 and of the gluing apparatus 81 are both completed before the cycle of operation of the presser apparatus begins, and the cycle of operation of presser apparatus is completed during that single revolution of the cam shaft and before another cycle of operation of the transfer apparatus or the gluing apparatus begins.

Preferably, during approximately the first quarter revolution of the cam shaft, transfer apparatus cam 235 forces its cam follower 236 to move the horizontal transfer rod 121 into contact with the rear edge of the spacer block in the bottom of the hopper. The rod forces or ejects that spacer block from the hopper into a position intermediate the hopper and the presser apparatus in which position that spacer block is held by the intermediate holding device (this intermediate holding device is not illustrated in Fig. 3 but spacer block 241 represents the position of that device). Reciprocating rod 121 is driven by cam 235 until it has completely ejected the bottom spacer block from the hopper and pushed it into its proper intermediate position. During the next quarter revolution of the cam shaft the transfer cam 235 and its follower 236 are withdrawing the reciprocating rod from the bottom of the hopper to its original position. The cam effects the complete withdrawal of the reciprocating rod from the bottom of the hopper so that another spacer block may drop into the bottom position to be abutted by the rod in its next cycle of operation.

During the first quarter of rotation of the cam shaft, cam 221 causes its follower including push rod 89 to tip rocker arm 86 and raise wheel 82 until that wheel comes in contact with the bottom of the spacer block while it is being moved from the bottom of the hopper. Wheel 82 is continuously driven by motor 84 and applies liquid glue as mentioned above to a limited central portion of the bottom of the spacer block. At the end of that quarter revolution of the cam shaft and when the spacer block has been moved completely to its intermediate position, the application of glue is stopped by the follower of cam 221 lowering wheel 82 out of the path of the spacer blocks.

During the second half revolution of the cam shaft the presser apparatus is lowering a block to the upper surface of the washer and is pressing that spacer block on the washer. The spacer block that is lowered to the washer by the presser apparatus is actually moved to the present apparatus during the first quarter revolution of the cam shaft by the reciprocating rod, in that the spacer block which is moved from the bottom of the hopper abuts the rear edge of the spacer block previously moved into the intermediate position, thereby moving the spacer block from the intermediate position to the presser apparatus. That is, the reciprocating rod of the transfer apparatus simultaneously moves two spacer blocks disposed in tandem.

The cycle of operation of the presser apparatus may begin as soon as the transfer rod has caused a spacer block to be moved completely into the presser apparatus from the intermediate position holding device or after approximately the first quarter of revolution of the cam shaft.

The initial action during the cycle of operation of the presser apparatus is that cam surfaces 471 and 481 of cam 233 and 231, respectively, cause the cam followers 232 and 234 of the outer and inner ram devices, respectively, to simultaneously lower the spacer block to the upper surface of the washer. The ram devices move in response to cam surface portion 471 and 481 from their position shown in Fig. 10 to their position shown in Fig. 11. As shown in Fig. 11 the inwardly tapered brackets of the hanging arms 193 and 199 abut the upper surface of the washer, and the spacer block actually is not yet making contact with the surface of the washer. During this movement in response to cam surfaces 471 and 481 there is no relative movement between the inner ram device and the outer ram device. They simultaneously move together down to the washer.

Next there is a short period of dwell for cam 231 of the outer ram device. This holds the position of that ram device. During this time the cam follower 234 of the inner ram device is riding on surface 472 which forces the cam follower to press the inner ram further downwardly thereby forcing the spacer block against the tapered brackets of the hanging arms 193, 199; those arms open outwardly until the bottom of the spacer block passes and abuts the upper surface of the washer. The position of the inner and outer rams at the beginning and at the end of this short period of cycle are illustrated in Figs. 11 and 12, respectively. When the inner ram has pressed the spacer block until it is in contact with the upper surface of the washer there occurs a period of dwell because of surface 473 of cam 233, during which time the spacer block is tightly set on the upper surface of the washer. The glue along the central portion of the spacer block is forced to spread outwardly resulting in a small bead or fillet of glue (not shown) along opposite edges of the spacer block which straightens the glued spacer against lateral force. However, during the latter part of this period of dwell caused by cam surface 473, curved surface 483 of cam 231 begins to raise the outer ram device lifting the hanging arms, 193, 199, above the block that is being pressed on the washer so that those arms will not disturb the spacer block when the inner ram is withdrawn from engagement with the spacer block. At the end of the pressing period represented by the surface 473 the inner ram is lifted, and both the inner ram and the outer ram devices are raised to their upper positions shown in Fig. 10 by surfaces 475 and 483 of their respective cams. This completes the cycle of operation of the transfer apparatus.

As mentioned above this cycle of operation has occurred during one quarter revolution of wheel 53 of the Geneva movement which is turned by drive shaft 43, and as soon as that quarter revolution is completed, one of the rollers carried by that wheel will engage with one of the slots of slotted wheel 54 and start the rotation of the turntable again so as to move the washer carried by the table to another position with respect to the header.

When a complete circle of spacer blocks have been disposed on the washer, the machine presses a spacer block on another spacer block already glued to the washer. This causes relative movement between the upper and lower parts of the outer ram, thereby actuating switch 196 which stops motor 41. The header or as many of them as are employed can be moved radially of the center of the washer by energizing motor 69 which turns screw shaft 73 to cause nut 74 carried by the header to move the header along the beam, to deposit another circular row of spacer blocks.

Although but one embodiment of the present invention has been illustrated and described, it will be apparent to one skilled in the art that various changes and modifications may be made therein without departing from the spirit of the invention or from the scope of the appended claims.

It is claimed and desired to secure by Letters Patent:

1. The combination comprising a table for carrying a washer made of insulating material, handling means for depositing spacer blocks on said washer including means for holding a supply of spacer blocks, means for individually moving spacer blocks from said supply means to said washer, means for moving said handling means radially with respect to said table, and means for moving said table about a center point to shift said handling means circumferentially with respect to said table.

2. The combination comprising a table for carrying a washer made of insulating material having a central opening, a centering head including a plurality of elements extending radially of the center of said table and disposed on the surface of said table to cause said elements to engage the edge of the central opening of said washer and position said washer with respect to the center of said table, handling means for depositing spacer blocks on said washer including a hopper for holding a supply of spacer blocks, means for individually moving spacer blocks from said hopper to said washer, means for applying glue to said spacer blocks as they are moved from said hopper to said washer, means for moving said handling means radially with respect to said table, and means for moving said table about its center to shift said handling means circumferentially with respect to said table.

3. The combination comprising a table for carrying a washer made of insulating material having a central opening, a centering head disposed centrally of said table, said centering head having three arms pivotally connected thereto, and means for moving said arms toward or away from the center of said table, the extreme ends of each of said arms being disposed on said table at equal radii from the center of said table to engage the edge of the central opening of said washer and position said washer about the center of said table, handling means for depositing spacer blocks on said washer including a hopper for holding a supply of spacer blocks, means for individually moving spacer blocks from said hopper to the washer, means for applying glue to said spacer blocks as they are moved from said hopper, means for moving said handling means radially of the center of said table to alter the positions said spacer blocks are deposited on the washer on said table, means for moving said table with respect to said handling means to circumferentially alter the positions said spacer blocks are deposited on the washer with respect to the center of said table.

4. The combination comprising a table for carrying a washer made of insulating material, handling means for depositing spacer blocks on said washer including a hopper for holding a supply of spacer blocks, means for individually moving spacer blocks from said hopper to said washer including a first member and a force applying means to move said first member toward said table through an operating cycle to press said spacer blocks on said washer, a second member disposed to bear against the spacer block in its movement from said hopper, means for arresting operation of said block moving means, means for applying glue to said spacer blocks as they are moved from said hopper to said washer, means for moving said handling means radially with respect to the center of said table, means for moving said table about its center to shift said handling means circumferentially with respect to said table, a first interrupting means for preventing operation of said handling means operative in response to operation of said arresting means, a second interrupting means for preventing operation of said handling means operative in response to said first member being restricted from operating through its complete cycle, a third interrupting means for preventing operation of said handling means operative in response to displacement of said second member from its normal position during the movement of a spacer block from said hopper to said washer.

5. The combination comprising a table for carrying a washer made of insulating material having a central opening, a centering head including a plurality of elements extending radially of the center of said table and disposed on the surface of said table to cause said elements to engage the edge of the central opening of said washer and position said washer with respect to the center of said table, handling means for depositing spacer blocks on said washer including a hopper for holding a supply of spacer blocks, means for individually moving spacer blocks from said hopper means to said washer including a first member and a force applying means to move said first member toward said table through an operating cycle to press said spacer blocks on said washer, a second member disposed to bear against the spacer block in its movement from said hopper, means for arresting operation of said block moving means, means for applying glue to said spacer blocks as they are moved from said hopper to said washer, means for moving said handling means radially with respect to the center of said table, means for moving said table about its center to shift said handling means circumferentially with respect to said table, a first interrupting means for preventing operation of said handling means operative in response to operation of said arresting means, a second interrupting means for preventing operation of said handling means operative in response to said first member being restricted from operating through its complete cycle, a third interrupting means for preventing operation of said handling means operative in response to displacement of said second member from its normal position during the movement of a spacer block from said hopper to said washer.

6. The combination comprising a table for carrying a washer made of insulating material, handling means for depositing spacer blocks on said washer including a hopper for holding a supply of spacer blocks, means for individually moving spacer blocks from said hopper to said washer including a spacer block force applying means to move toward said table through an operating cycle to press said spacer blocks on said washer, means for arresting operation of said block moving means, means for applying glue to said spacer blocks as they are moved from said hopper to said table, means for moving said handling means radially with respect to the center of said table, means for moving said table about its center to shift said handling means circumferentially with respect to said table, and interrupting means for preventing operation of said handling means operative in response to operation of said arresting means.

7. The combination comprising a table for carrying a washer made of insulating material, handling means for depositing spacer blocks on said washer including a hopper for holding a supply of spacer blocks, means for individually moving spacer blocks from said hopper to said washer including a member and force applying means to move said member toward said table through an operating cycle to press said spacer blocks on said washer, means for applying glue to said spacer blocks as they are moved from said hopper to said table, means for moving said handling means radially with respect to the center of said table, means for moving said table about its center to shift said handling means circumferentially with respect to said table, and interrupting means for preventing operation of said handling means operative in response to said member being restricted from operating through its complete cycle.

8. The combination comprising a table for carrying a washer made of insulating material, handling means for depositing spacer blocks on said washer including a hopper for holding a supply of spacer blocks, means for individually moving spacer blocks from said hopper to said washer including a member disposed to bear against the spacer block in its movement from said hopper, means for applying glue to said spacer blocks as they are moved from said hopper to said table, means for moving said handling means radially with respect to the center of said table, means for moving said table about its center to shift said handling means circumferentially with respect to said table, and interrupting means operative in response to displacement of said member from its normal position during the movement of a spacer block from said supply means to said washer.

9. The combination comprising a table for carrying a washer made of insulating material having a central opening, a centering head including a plurality of elements extending radially of the center of said table and disposed on the surface of said table to cause said elements to engage the edge of the central opening of said washer and position said washer with respect to the center of said table, handling means for depositing spacer blocks on said washer including a hopper for holding a supply of spacer blocks, means for individually moving spacer blocks from said supply means to said washer including force applying means to move said member toward said table through an operating cycle to press said spacer blocks on said washer, means for arresting operation of said block moving means, means for applying glue to said spacer blocks as they are moved from said hopper to said washer, means for moving said handling means radially with respect to said table, means for moving said table about its center to shift said handling means circumferentially with respect to said table, and an interrupting means for preventing operation of said handling means operative in response to operation of said arresting means.

10. The combination comprising a table for carrying a washer made of insulating material, a hopper for holding a supply of spacer blocks; handling means for depositing spacer blocks on said washer including means for individually moving spacer blocks from said hopper to the washer and spacer block force applying means to move toward said table through an operating cycle to press said spacer blocks on said washer; means for applying glue to said spacer blocks as they are moved from said hopper; means for effecting movement of said handling means radially with respect to the center of said table to alter the positions said spacer blocks are deposited on the washer on said table, motor driven means for moving said table with respect to said handling means to circumferentially alter the positions said spacer blocks are deposited on the washer, means periodically energized by said motor driven means to operate said handling means, and interrupting means for deenergizing said motor driven means for preventing operation of the said handling means operative in response to said force applying means being restricted from moving through its complete cycle, and means energized by the operation of said interrupting means to signal the interruption of operation of said handling means.

11. The combination comprising a table for carrying a washer made of insulating material, a hopper for holding a supply of spacer blocks; handling means for depositing spacer blocks on said washer comprising means for individually moving spacer blocks from said hopper to the washer, and a member disposed to bear against the spacer block in its movement from said hopper; means for applying glue to said spacer blocks as they are moved from said hopper, means for moving said handling means radially with respect to the center of said table to alter the positions said spacer blocks are deposited on the washer on said table, motor driven means for moving said table with respect to said handling means to circumferentially alter the positions said spacer blocks are deposited on the washer, and interrupting means for deenergizing said motor driven means for preventing operation of said handling means operative in response to displacement of said bearing member from its normal position in the movement of a spacer block by said block moving means, and means energized by the operation of said interrupting means to signal the interruption of operation of said handling means.

12. The combination comprising a table for carrying a washer made of insulating material, a hopper for holding a supply of spacer blocks; handling means for depositing spacer blocks on said washer comprising means for individually moving spacer blocks from said hopper to the washer including a first member and force applying means to move said first member toward said table through an operating cycle to press said spacer blocks on said washer, a second member disposed to bear against the spacer block in its movement from said hopper, and means for arresting operation of said block moving means; means for applying glue to said spacer blocks as they are moved from said hopper, means for moving said handling means radially with respect to the center of said table to alter the positions said spacer blocks are deposited on the washer on said table, motor driven means for moving said table with respect to said handling means to circumferentially alter the positions said spacer blocks are deposited on the washer, means periodically energized by said motor driven means to operate said handling means, a first indicator circuit, means to energize said first indicator circuit and to deenergize said motor driven means operative in response to operation of said arresting means, a second indicator circuit, means to energize said second indicator circuit and to deenergize said motor driven means operative in response to said first member being restricted from moving through its complete cycle, a third indicator circuit, means to energize said third indicator circuit and to deenergize said motor driven means operative in response to displacement of said bearing member from its normal position in the movement of a spacer block by said block moving means.

13. The combination comprising a table for carrying a washer made of insulating material and having a central opening, a centering head disposed centrally of said table, said centering head having three arms pivotally connected thereto, and means for moving said arms toward or away from the center of said table, the extreme ends of each of said arms being disposed on said table at equal radii from the center of said table, whereby they may engage the edge of the central opening of said washer to position said washer about the center of said table, a hopper for holding a supply of spacer blocks; handling means for depositing spacer blocks on said washer comprising means for individually moving spacer blocks from said hopper to the washer including spacer block force applying means to move toward said table through an operating cycle to press said spacer blocks on said washer, and means for arresting operation of said block moving means; means for applying glue to said spacer blocks as they are moved from said hopper, means for moving said handling means radially with respect to the center of said table to alter the positions said spacer blocks are deposited on the washer on said table, motor driven means for moving said table with respect to said handling means to circumferentially alter the positions said spacer blocks are deposited on the washer, and a first indicator circuit, means to energize said first indicator circuit and to deenergize said motor driven means operative in response to operation of said arresting means.

14. The combination comprising a table for carrying a washer made of insulating material and having a central opening, a centering head disposed centrally of said table, said centering head having three arms pivotally connected thereto, and means for moving said arms toward or away from the center of said table, the extreme ends of each of said arms being disposed on said table at equal radii from the center of said table to engage the edge of the central opening of said washer and position said washer about the center of said table, a hopper for holding a supply of spacer blocks; handling means for depositing spacer blocks on said washer comprising means for individually moving spacer blocks from said hopper to the washer including a first member and force applying means to move said first member toward said table through an operating cycle to press said spacer blocks on said washer, a second member disposed to bear against the spacer block in its movement from said hopper, and means for arresting operation of said block moving means; means for applying glue to said spacer blocks as they are moved from said hopper, means for moving said handling means radially with respect to said table to alter the positions said spacer blocks are deposited on the washer on said table, motor driven means for moving said table with respect to said handling means to circumferentially alter the positions said spacer blocks are deposited on the washer, a first interrupting means for deenergizing said motor driven means to prevent movement of said table and operation of said handling means operative in response to operation of said arresting means, a second interrupting means for deenergizing said motor driven means to prevent movement of said table and operation of said handling means operative in response to said first member being restricted from moving through its complete cycle, a third interrupting means for deenergizing said motor driven means to prevent movement of said table and operation of said handling means operative in response to displacement of said bearing member from its normal position in the movement of a spacer block by said block moving means, and means energized by the operation of each of said interrupting means to signal the respective interruption of operation of said handling means.

15. The combination comprising a table for carrying a washer having a central opening, a centering head disposed centrally of said table, said centering head having three arms pivotally connected thereto, and means for simultaneously moving said arms toward or away from the center of said table with the extreme ends of each of said arms being disposed on the surface of said table to engage the edge of the central opening of said washer to position said washer about the center of said table, a beam disposed over said table extending parallel to a radius from said center, said beam having a fixed position independently of said table, a header carried by said beam, means for independently and reversibly moving said header lengthwise of said beam, motor driven means for periodically rotating said table about its center to shift said table with respect to said header, anti-backlash means for preventing reversal of movement of said table when said table is stopped, said header including cam means, motor means for driving said cam means, a clutch between said motor means and said cam means for keeping said cam means normally inoperative, clutch circuit means periodically energized by said table rotating means for engaging said motor means with said cam means, means for disengaging said clutch after a cycle operation of said cam means, a hopper for holding a supply of spacer blocks; handling means operated by said cam means for depositing spacer blocks on said washer comprising means for individually moving spacer blocks from said hopper to said washer including a first member and force supplying means to move said first member towards said table through an operating cycle to press said spacer blocks on said washer, a second member disposed to bear against the spacer block in its movement from said hopper, and means for arresting operation of said block moving means; means for applying glue to said spacer blocks as they are moved from said hopper, a first indicator circuit, means to energize said first indicator circuit and to deenergize said motor driven means preventing operation of said handling means operative in response to operation of said arresting means, a second indicator circuit, means to energize said second indicator circuit and to deenergize said motor driven means preventing operation of said handling means operative in response to said first member being restricted from moving through its complete cycle, a third indicator circuit, means to energize said third indicator circuit and to deenergize said motor driven means preventing operation of said handling means operative in response to displacement of said bearing member from its normal position in a movement of a spacer block by said block moving means, a fourth indicator circuit, a piece disposed in said hopper on top of said spacer blocks, and means to energize said fourth indicator circuit and to deenergize said motor driven means operative in response to said piece being lowered to a position near the bottom of said hopper.

References Cited in the file of this patent

UNITED STATES PATENTS

| | | |
|---|---|---|
| 2,169,063 | Wensley et al. | Aug. 8, 1939 |
| 2,593,801 | Sauer | Apr. 22, 1952 |